(12) United States Patent
Pfau

(10) Patent No.: US 12,358,504 B2
(45) Date of Patent: Jul. 15, 2025

(54) CONTROLLER AND CONTROL METHOD FOR CONTROLLING OPERATION OF MOTORCYCLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 213 days.

(21) Appl. No.: 17/439,595

(22) PCT Filed: Mar. 17, 2020

(86) PCT No.: PCT/IB2020/052414
§ 371 (c)(1),
(2) Date: Sep. 15, 2021

(87) PCT Pub. No.: WO2020/201867
PCT Pub. Date: Oct. 8, 2020

(65) Prior Publication Data
US 2022/0153268 A1 May 19, 2022

(30) Foreign Application Priority Data
Mar. 29, 2019 (JP) .................................. 2019-066839

(51) Int. Cl.
*B60W 30/17* (2020.01)
*B60W 50/14* (2020.01)
*B62J 50/21* (2020.01)

(52) U.S. Cl.
CPC ............ *B60W 30/17* (2013.01); *B60W 50/14* (2013.01); *B62J 50/21* (2020.02);
(Continued)

(58) Field of Classification Search
CPC .. B60W 30/17; B60W 50/14; B60W 2300/36; B60W 2554/4041;
(Continued)

(56) References Cited

U.S. PATENT DOCUMENTS 10,558,224 B1 * 2/2020 Lin ........................ G05D 1/0285
10,882,523 B2 * 1/2021 Knitt .................... B60W 50/085
(Continued)

FOREIGN PATENT DOCUMENTS

DE   102016208846 A1 * 11/2017 ......... B60R 16/0231
DE   102017213278 A1 *  2/2019
WO     2018172870 A1     9/2018

OTHER PUBLICATIONS

Boris Israel, Aug. 1, 2017, English Machine Translation_DE102017213278A1 provided by Patent Translate by EPO and Google (Year: 2017).*

(Continued)

*Primary Examiner* — Ashley L Redhead, Jr.
(74) *Attorney, Agent, or Firm* — Michael Best & Friedrich LLP

(57) ABSTRACT

A controller that controls operation of the motorcycle, to which a surrounding environment detector is mounted, includes: an acquisition section that acquires information on the surrounding environment of the motorcycle on the basis of output of the surrounding environment detector during travel of the motorcycle; and an adaptive cruise operation performing section that makes the motorcycle perform adaptive cruise operation on the basis of the surrounding environment information acquired by the acquisition section. The acquisition section acquires other vehicle travel state information that is information on a travel state of an other vehicle acquired by a different vehicle from the motorcycle via wireless communication. The controller further includes a safety operation performing section that makes the motorcycle currently performing the adaptive cruise operation perform safety operation on the basis of the other vehicle travel state information acquired by the acquisition section.

14 Claims, 2 Drawing Sheets

(52) U.S. Cl.
CPC . *B60W 2300/36* (2013.01); *B60W 2554/4041* (2020.02); *B60W 2554/4042* (2020.02); *B60W 2554/4044* (2020.02); *B60W 2554/406* (2020.02); *B60W 2554/802* (2020.02); *B60W 2554/804* (2020.02); *B60W 2556/65* (2020.02); *B60W 2720/10* (2013.01)

(58) Field of Classification Search
CPC . B60W 2554/4042; B60W 2554/4044; B60W 2554/406; B60W 2554/802; B60W 2554/804; B60W 2556/65; B60W 2720/10; B60W 2554/4043; B60W 2050/143; B60W 30/16; B62J 50/21; B60K 2310/244; B60K 2310/266
See application file for complete search history.

(56) References Cited

U.S. PATENT DOCUMENTS

| | | | | |
|---|---|---|---|---|
| 2002/0072843 A1* | 6/2002 | Russell | ............ | B60W 30/16 180/170 |
| 2010/0214085 A1* | 8/2010 | Avery | ............ | G08G 1/161 340/435 |
| 2015/0293216 A1* | 10/2015 | O'Dea | ............ | B60W 40/06 701/23 |
| 2016/0071418 A1* | 3/2016 | Oshida | ............ | G05D 1/0295 701/23 |
| 2017/0355368 A1* | 12/2017 | O'Dea | ............ | B60W 30/14 |
| 2017/0364629 A1* | 12/2017 | Tarte | ............ | B60Q 1/143 |
| 2017/0369010 A1* | 12/2017 | Tarte | ............ | B60W 50/14 |
| 2017/0369055 A1* | 12/2017 | Saigusa | ............ | G08G 1/161 |
| 2018/0118223 A1* | 5/2018 | Mori | ............ | B60W 40/04 |
| 2018/0160333 A1* | 6/2018 | Patil | ............ | H04W 28/0236 |
| 2018/0229628 A1* | 8/2018 | Minato | ............ | B60N 2/2227 |
| 2019/0248367 A1* | 8/2019 | Knitt | ............ | B60W 50/14 |
| 2019/0286130 A1* | 9/2019 | Tsuchiya | ............ | G06V 20/588 |
| 2020/0172123 A1* | 6/2020 | Kubota | ............ | B60W 60/0053 |
| 2022/0169239 A1* | 6/2022 | Nose | ............ | B62J 45/422 |
| 2022/0185275 A1* | 6/2022 | Pfau | ............ | B60W 30/16 |

OTHER PUBLICATIONS

Harald Feifel, May 23, 2016, English Machine Translation_ DE102016208846A1 provided by Patent Translate by EPO and Google (Year: 2016).*

International Search Report and Written Opinion for Application No. PCT/IB2020/052414 dated Jul. 13, 2020 (9 pages).

* cited by examiner

[FIG. 1]
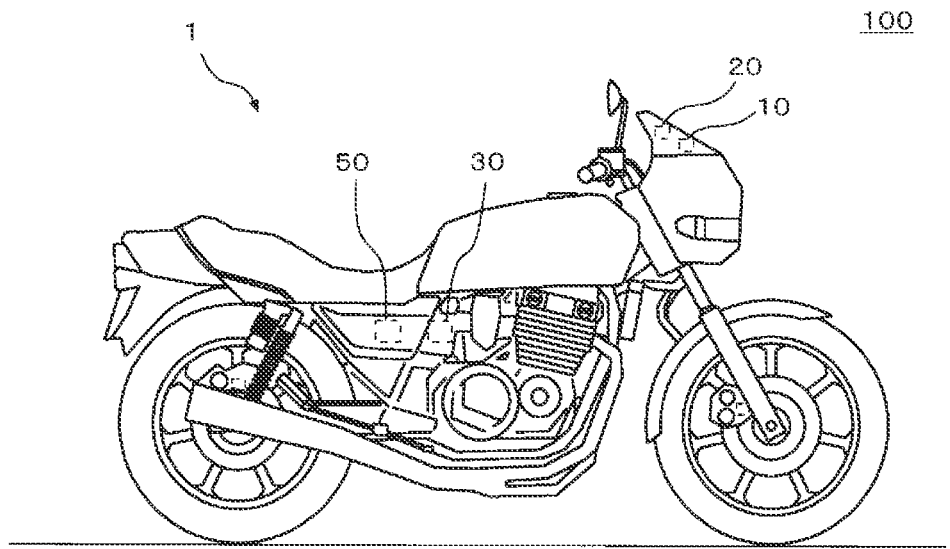
[FIG. 2]
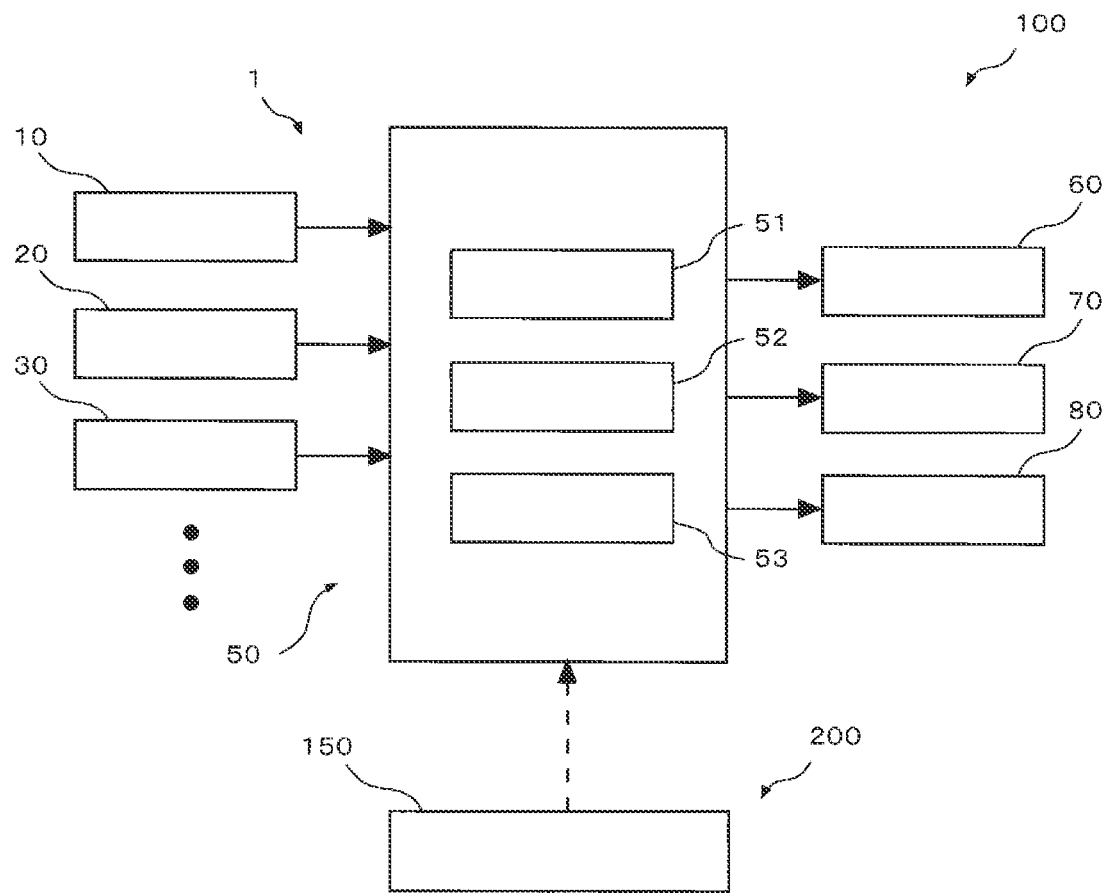

[FIG. 3]
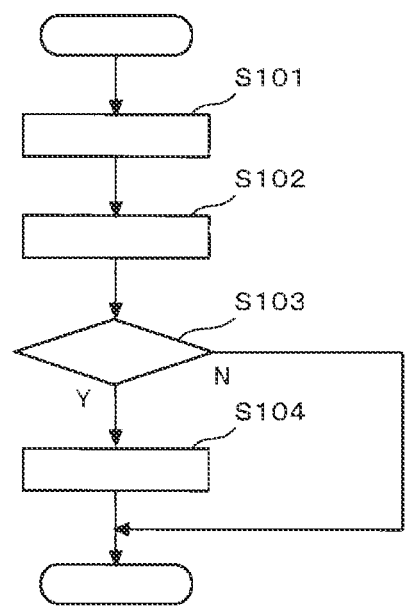

CONTROLLER AND CONTROL METHOD FOR CONTROLLING OPERATION OF MOTORCYCLE

BACKGROUND OF THE INVENTION

The present invention relates to a controller and a control method for controlling operation of a motorcycle to which a surrounding environment detector is mounted.

A technique of making a motorcycle (a two-wheeled motor vehicle or a three-wheeled motor vehicle) perform adaptive cruise operation has been known. The adaptive cruise operation is operation to make the motorcycle travel according to a distance from the motorcycle to a preceding vehicle, motion of the motorcycle, and a rider's instruction.

SUMMARY OF THE INVENTION

By the way, in the case where the motorcycle performs the adaptive cruise operation while generating acceleration/deceleration to such an extent that a safety problem does not occur in other vehicles (for example, a passenger car, a truck, and the like with four wheels), a situation where the rider who gets shocked by a speed change turns over the motorcycle possibly occurs due to likelihood of unstable body behavior of the motorcycle during travel in comparison with the other vehicles. Therefore, such a need possibly arises that a possibility of generation of such acceleration/deceleration is reduced by promptly detecting information on the surrounding environment of a location, a need for detection of which is low for the other vehicles, using a surrounding environment detector. Meanwhile, there is a limitation on expansion of a detection range by the surrounding environment detector mounted to the motorcycle, for example, from perspectives of deteriorated detection accuracy, a delay in arithmetic processing, and the like. That is, there is a problem that, in the case where the adaptive cruise operation performed by the motorcycle is controlled in a similar manner to the adaptive cruise control performed by the other vehicles, it possibly becomes difficult to secure the rider's safety.

The present invention has been made with the above-described problem as the background and therefore obtains a controller and a control method capable of appropriately assisting with driving of a motorcycle by a rider.

A controller according to the present invention is a controller that controls operation of a motorcycle, to which a surrounding environment detector is mounted, and includes: an acquisition section that acquires information on a surrounding environment of the motorcycle on the basis of output of the surrounding environment detector during travel of the motorcycle; and an adaptive cruise operation performing section that makes the motorcycle perform adaptive cruise operation on the basis of the surrounding environment information acquired by the acquisition section. The acquisition section acquires other vehicle travel state information that is information on a travel state of other vehicle acquired by a different vehicle from the motorcycle via wireless communication. The controller further includes a safety operation performing section that makes the motorcycle performing the adaptive cruise operation perform safety operation on the basis of the other vehicle travel state information acquired by the acquisition section.

A control method according to the present invention is a control method that controls operation of a motorcycle, to which a surrounding environment detector is mounted, and includes: an acquisition step in which an acquisition section of a controller acquires information on a surrounding environment of the motorcycle on the basis of output of the surrounding environment detector during travel of the motorcycle; and an adaptive cruise operation performing step in which an adaptive cruise operation performing section of the controller makes the motorcycle perform adaptive cruise operation on the basis of the surrounding environment information acquired in the acquisition step. In the acquisition step, the acquisition section acquires other vehicle travel state information that is information on a travel state of other vehicle acquired by a different vehicle from the motorcycle via wireless communication. The control method further includes safety operation performing steps in which a safety operation performing section of the controller makes the motorcycle currently performing the adaptive cruise operation perform safety operation on the basis of the other vehicle travel state information acquired in the acquisition step.

In the controller and the control method according to the present invention, the acquisition section acquires the other vehicle travel state information that is the information on the travel state of the other vehicle acquired by the different vehicle from the motorcycle via the wireless communication, and the safety operation performing section makes the motorcycle currently performing the adaptive cruise operation perform the safety operation on the basis of the other vehicle travel state information. That is, on the basis of information beyond a detection range of the surrounding environment detector mounted to the motorcycle, the motorcycle during the adaptive cruise operation can perform the safety operation. Therefore, it is possible to perform the safety operation at a further early stage and thus to reliably secure a rider's safety.

BRIEF DESCRIPTION OF THE DRAWINGS

FIG. 1 is a view of a mounted state of a rider-assistance system according to an embodiment of the present invention to a motorcycle.

FIG. 2 is a diagram for illustrating a system configuration of the rider-assistance system according to the embodiment of the present invention.

FIG. 3 is a chart of an example of a control flow by a controller in the rider-assistance system according to the embodiment of the present invention.

DETAILED DESCRIPTION

A description will hereinafter be made on a controller and a control method according to the present invention with reference to the drawings.

A term "motorcycle" means a two-wheeled motor vehicle or a three-wheeled motor vehicle among straddle-type vehicles straddled by riders. The motorcycles include: the two-wheeled motor vehicle or the three-wheeled motor vehicle that has an engine as a propelling source; the two-wheeled motor vehicle or the three-wheeled motor vehicle that has a motor as the propelling source; and the like, and examples of the motorcycles are a bike, a scooter, and an electric scooter. The following description will be made on a case where the motorcycle is the two-wheeled motor vehicle. However, the motorcycle may be the three-wheeled motor vehicle.

A configuration, operation, and the like, which will be described below, merely constitute one example. The controller and the control method according to the present invention are not limited to a case with such a configuration, such operation, and the like. The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

A description will hereinafter be made on a rider-assistance system according to an embodiment.

<Configuration of Rider-Assistance System>

A description will be made on a configuration of the rider-assistance system according to the embodiment.

FIG. 1 is a view of a mounted state of the rider-assistance system according to the embodiment of the present invention to a motorcycle. FIG. 2 is a diagram for illustrating a system configuration of the rider-assistance system according to the embodiment of the present invention.

As illustrated in FIG. 1 and FIG. 2, a rider-assistance system 1 is mounted to a motorcycle 100. The rider-assistance system 1 at least includes: a surrounding environment detector 10 that detects surrounding environment in front of the motorcycle 100; an input device 20 operated by a rider; a travel state detector 30 that detects a travel state of the motorcycle 100; and a controller (ECU) 50.

The surrounding environment detector 10 monitors an area in front of the motorcycle 100 and detects various types of information on the area in front of the motorcycle 100. More specifically, the surrounding environment detector 10 detects a predicted route that is a route predicted to be traveled by the motorcycle 100 in the future. The surrounding environment detector 10 may detect another physical quantity that can substantially be converted to the predicted route. The surrounding environment detector 10 also detects a distance from the motorcycle 100 to a preceding vehicle. The surrounding environment detector 10 may detect another physical quantity that can substantially be converted to the distance from the motorcycle 100 to the preceding vehicle.

In the case where a plurality of vehicles travels in front of the motorcycle 100, on the basis of the predicted route of the motorcycle 100 and behavior of each of the vehicles, the surrounding environment detector 10 selects the vehicle that travels at the closest position to the motorcycle 100 on the same lane as a travel lane of the motorcycle 100 as the preceding vehicle that is a target for detecting the distance thereof from the motorcycle 100. At this time, in addition to the vehicle that travels at the closest position to the motorcycle 100 on the same lane as the travel lane of the motorcycle 100, the vehicle traveling ahead of several vehicles in front of the motorcycle 100, the vehicle traveling on an adjacent lane to the travel lane of the motorcycle 100, and the like may be included as the preceding vehicles, each of which is the target for detecting the distance thereof from the motorcycle 100. Adaptive cruise operation, which will be described later, is performed by using a detection result on the distance from the motorcycle 100 to the preceding vehicle.

As the surrounding environment detector 10, for example, a camera that captures an image in front of the motorcycle 100 and a radar that can detect the distance from the motorcycle 100 to the target in front are used. In such a case, for example, white lines, guardrails, and the like are recognized by using the image captured by the camera. Then, by using recognition results of these and a detection result by the radar, the predicted route of the motorcycle 100 can be detected. In addition, for example, the preceding vehicle is recognized by using the image captured by the camera. Then, by using a recognition result of the preceding vehicle and the detection result by the radar, the distance from the motorcycle 100 to the preceding vehicle can be detected. The surrounding environment detector 10 is provided to a front portion of a vehicle body, for example.

The configuration of the surrounding environment detector 10 is not limited to that in the above example. For example, the function of detecting the predicted route of the motorcycle 100 and the function of detecting the distance from the motorcycle 100 to the preceding vehicle by the surrounding environment detector 10 may be implemented only by the radar or may be implemented by a stereo camera. Alternatively, the function of detecting the predicted route of the motorcycle 100 by the surrounding environment detector 10 may be implemented by using a signal received from the Global Positioning System (GPS) satellite and map information, for example.

The input device 20 accepts a travel mode selecting operation by the rider, and outputs information on the travel mode selected by the rider. As will be described later, in the motorcycle 100, the controller 50 can perform the adaptive cruise operation. The adaptive cruise operation corresponds to an example of cruise operation in which acceleration/deceleration of the motorcycle 100 is automatically controlled without relying on an accelerating/decelerating operation by the rider, and is control that makes the motorcycle 100 travel according to the distance from the motorcycle 100 to the preceding vehicle, motion of the motorcycle 100, and the rider's instruction. By using the input device 20, the rider can select, as one of the travel modes, a travel mode in which the adaptive cruise operation is performed. As the input device 20, a lever, a button, a touchscreen, or the like is used, for example. The input device 20 is provided to a handlebar, for example.

The travel state detector 30 includes a front-wheel rotational frequency sensor, a rear-wheel rotational frequency sensor, and the like, for example. Each of the front-wheel rotational frequency sensor and the rear-wheel rotational frequency sensor detects a rotational frequency of a wheel and outputs a detection result. Each of the front-wheel rotational frequency sensor and the rear-wheel rotational frequency sensor may detect another physical quantity that can substantially be converted to the rotational frequency of the wheel.

The travel state detector 30 also includes an inertial measurement device, for example. The inertial measurement device includes a three-axis gyroscope sensor and a three-directional acceleration sensor and outputs detection results of three-axis acceleration and three-axis angular velocities of the motorcycle 100. The inertial measurement device may detect other physical quantities that can substantially be converted to the three-axis acceleration and the three-axis angular velocities.

The travel state detector 30 further includes a braking force measurement device, a drive power measurement device, and the like, for example. For example, the braking force measurement device outputs detection results such as an operation amount of a brake operation by the rider and an actual braking force generated by a braking device 60. The braking force measurement device may detect other physical quantities that can substantially be converted to the operation amount of the brake operation by the rider and the actual braking force generated by the braking device 60. For example, the drive power measurement device outputs detection results such as an operation amount of an accelerator operation by the rider and actual drive power generated by a drive device 70. The drive power measurement device may detect other physical quantities that can substantially be converted to the operation amount of the accelerator operation by the rider and the actual drive power generated by the drive device 70.

The travel state detector 30 includes a receiver that receives the signal from the GPS satellite and a storage section that stores the map information, for example. Another configuration capable of detecting a position or an advancing direction of the motorcycle 100 may be adopted.

The controller 50 controls operation of the motorcycle 100. For example, the controller 50 is partially or entirely constructed of a microcomputer, a microprocessor unit, or the like. Alternatively, the controller 50 may partially or entirely be constructed of a member in which firmware or the like can be updated, or may partially or entirely be a program module or the like that is executed by a command from a CPU or the like, for example. The controller 50 may be provided as one unit or may be divided into multiple units, for example.

As illustrated in FIG. 2, the controller 50 includes an acquisition section 51, an adaptive cruise operation performing section 52, and a safety operation performing section 53.

The acquisition section 51 acquires the information that is output from each of the devices mounted to the motorcycle 100, and outputs the acquired information to the adaptive cruise operation performing section 52. More specifically, the acquisition section 51 acquires surrounding environment information on the basis of the information output from the surrounding environment detector 10, acquires rider setting information on the basis of the information output from the input device 20, and acquires information on the travel state of the motorcycle 100 on the basis of the information output from the travel state detector 30. The travel state information includes at least one type of the information including a speed, the acceleration/deceleration, the position, and the advancing direction of the motorcycle 100.

The adaptive cruise operation performing section 52 controls operation of each of the devices (the braking device 60, the drive device 70, and the like) mounted to the motorcycle 100, so as to control the drive power and the braking force to be generated by the motorcycle 100. In this way, the adaptive cruise operation performing section 52 controls the acceleration/deceleration of the motorcycle 100 to perform the adaptive cruise operation. More specifically, in the case where the acquisition section 51 acquires the rider setting information indicating that the rider has selected the travel mode in which the adaptive cruise operation is performed, the adaptive cruise operation performing section 52 performs the adaptive cruise operation on the basis of the surrounding environment information and the travel state information. In the case where the rider performs the accelerating/decelerating operation (that is, the accelerator operation or the brake operation) during the adaptive cruise operation, the adaptive cruise operation performing section 52 cancels the adaptive cruise operation.

In the adaptive cruise operation, the acceleration/deceleration of the motorcycle 100 is basically controlled such that the distance from the motorcycle 100 to the preceding vehicle approximates a target distance. As the distance from the motorcycle 100 to the preceding vehicle, the target distance is set to a value with which the rider's safety can be secured. In the case where no preceding vehicle is recognized, the acceleration/deceleration of the motorcycle 100 is controlled such that the speed of the motorcycle 100 becomes a set speed set by the rider. Meanwhile, in the case where the preceding vehicle is recognized, the acceleration/deceleration of the motorcycle 100 is controlled such that the speed of the motorcycle 100 becomes equal to or lower than the set speed set by the rider. In addition, in the adaptive cruise operation, the acceleration/deceleration of the motorcycle 100 is restricted to be equal to or lower than an upper limit value of such an extent that does not worsen the rider's comfort.

More specifically, during the adaptive cruise operation, the adaptive cruise operation performing section 52 calculates target acceleration/deceleration, at which the distance from the motorcycle 100 to the preceding vehicle approximates the target distance, on the basis of a comparison result between the distance from the motorcycle 100 to the preceding vehicle and the target distance and on the basis of a relative speed between the motorcycle 100 and the preceding vehicle. Then, the adaptive cruise operation performing section 52 controls the acceleration/deceleration of the motorcycle 100 to the target acceleration/deceleration.

For example, in the case where the distance from the motorcycle 100 to the preceding vehicle is longer than the target distance, the adaptive cruise operation performing section 52 calculates, as the target acceleration/deceleration, the acceleration that corresponds to a difference between the distance from the motorcycle 100 to the preceding vehicle and the target distance. On the other hand, in the case where the distance from the motorcycle 100 to the preceding vehicle is shorter than the target distance, the adaptive cruise operation performing section 52 calculates, as the target acceleration/deceleration, the deceleration that corresponds to the difference between the distance from the motorcycle 100 to the preceding vehicle and the target distance. In addition, in the case where the target acceleration/deceleration based on the set speed is lower than the target acceleration/deceleration based on the target distance in a situation where the preceding vehicle is recognized, the adaptive cruise operation performing section 52 controls the acceleration/deceleration of the motorcycle 100 to the target acceleration/deceleration based on the set speed.

The acquisition section 51 also acquires information that is output from each device mounted to a different vehicle 200 from the motorcycle 100 via wireless communication, and outputs the acquired information to the safety operation performing section 53. More specifically, the acquisition section 51 acquires other vehicle travel state information on the basis of information that is output from other vehicle travel state detector 150 in the different vehicle 200. The other vehicle travel state information includes at least one type of information including a speed, acceleration/deceleration, a position, and an advancing direction of the other vehicle. In addition, the other vehicle travel state information may be information on the travel state of the other vehicle that is located at a position beyond a detection range of the surrounding environment detector 10 mounted to the motorcycle 100. Furthermore, the other vehicle travel state information may be information on the travel state of the different vehicle 200, to which the other vehicle travel state detector 150 is mounted, or may be information on the travel state of a different vehicle from the different vehicle 200, to which the other vehicle travel state detector 150 is mounted. In the case where the other vehicle travel state information is information on the travel state of the vehicle that differs from the different vehicle 200, to which the other vehicle travel state detector 150 is mounted, the travel state information thereof may be acquired by the other vehicle travel state detector 150, which functions as the surrounding environment detector, in the different vehicle 200, or may be acquired through the wireless communication between a communication device of the vehicle and a communication device of the different vehicle 200. The acquisition section 51 may acquire the other vehicle travel state information through the direct wireless communication between a communication device of the motorcycle 100 and the communication device of the different vehicle 200, or may acquire the other vehicle travel state information through the wireless communication between the communication device of the motorcycle 100 and the communication device of the different vehicle 200 via a network server.

The safety operation performing section 53 determines whether it is necessary for the motorcycle 100 to perform safety operation on the basis of the other vehicle travel state information acquired by the acquisition section 51. If determining that it is necessary, the safety operation performing section 53 makes the motorcycle 100 perform the safety operation.

The safety operation is operation to improve the safety of the rider of the motorcycle 100. For example, the safety operation includes operation to alert the rider, operation to urge the rider to cancel the adaptive cruise operation, operation to urge the rider to change the lane, operation to urge the rider to make travel between the lanes, and the like by using a notification device 80 mounted to the motorcycle 100. Furthermore, for example, the safety operation includes operation to output a command for lowering the speed generated to the motorcycle 100 in the adaptive cruise operation to the adaptive cruise operation performing section 52, operation to output a command for lowering an upper limit value of the speed to be generated by the motorcycle 100 in the adaptive cruise operation to the adaptive cruise operation performing section 52, operation to output a command for canceling the currently-performed adaptive cruise operation to the adaptive cruise operation performing section 52, and the like.

The notification device 80 may warn the rider by sound (that is, a sensation through an auditory organ as a sensory organ), may warn the rider by a display (that is, a sensation through a visual organ as the sensory organ), may warn the rider by vibrations (that is, a sensation through a tactile organ as the sensory organ), or may warn the rider by a combination of those. In addition, the notification device 80 may be provided to the motorcycle 100 or may be provided in an accessory such as a helmet that is associated with the motorcycle 100. Furthermore, the notification device 80 may be constructed of a single output device or may be constructed of multiple output devices of the same type or different types. The multiple output devices may be provided integrally or may be provided separately. Moreover, the notification device 80 may warn the rider by generating the sudden acceleration/deceleration to the motorcycle 100. That is, the notification device 80 may be realized by the braking device 60, the drive device 70, or the like.

The safety operation performing section 53 determines presence or absence of the other vehicle in a sudden deceleration state on a lane for vehicles heading for the same direction as the motorcycle 100 on the basis of the other vehicle travel state information, for example. If determining that such other vehicle is present, the safety operation performing section 53 performs the safety operation. When determining the presence or absence of the other vehicle in the sudden deceleration state, the safety operation performing section 53 preferably and only selects, as a determination target, the other vehicle that travels ahead of the motorcycle 100 on the lane for the vehicles heading for the same direction as the motorcycle 100. For example, in the case where the other vehicle that travels on the same lane as or the different lane from the lane where the motorcycle 100 travels is located closer to the motorcycle 100 than a reference di stance and the lower acceleration/deceleration than reference acceleration/deceleration is generated to the other vehicle in a state where the adaptive cruise operation is performed, the safety operation performing section 53 determines that the other vehicle in the sudden deceleration state is present. For example, the safety operation performed by the safety operation performing section 53 is operation to make the notification device 80 perform the operation to alert the rider, operation to make the notification device 80 perform the operation to urge the rider to cancel the adaptive cruise operation, operation to make the notification device 80 perform the operation to urge the rider to change the lane, or the like. Alternatively for example, the safety operation performed by the safety operation performing section 53 is the operation to output the command for lowering the speed generated to the motorcycle 100 in the adaptive cruise operation to the adaptive cruise operation performing section 52, the operation to output the command for lowering (preferably lowering only in a specified period) the upper limit value of the speed to be generated by the motorcycle 100 in the adaptive cruise operation to the adaptive cruise operation performing section 52, the operation to output the command for canceling the currently-performed adaptive cruise operation to the adaptive cruise operation performing section 52, or the like.

The safety operation performing section 53 determines presence or absence of the other vehicle in a state with a collision possibility on the lane for the vehicles heading for the same direction as the motorcycle 100 on the basis of the other vehicle travel state information, for example. If determining that such other vehicle is present, the safety operation performing section 53 performs the safety operation. When determining the presence or absence of the other vehicle in the state with the collision possibility, the safety operation performing section 53 may only select, as the determination target, the other vehicle that travels ahead of the motorcycle 100 on the lane for the vehicles heading for the same direction as the motorcycle 100, may only select, as the determination target, the other vehicle that travels behind the motorcycle 100, or may select both of the vehicles as the determination targets. For example, in the case where the other vehicle that travels on the same lane as the lane where the motorcycle 100 travels is located closer to the motorcycle 100 than the reference distance and the relative speed of the motorcycle 100 to the other vehicle is higher than a reference relative speed in the state where the adaptive cruise operation is performed, the safety operation performing section 53 determines that the other vehicle in the state with the collision possibility is present. Alternatively, for example, in the case where the other vehicle that travels ahead of the motorcycle 100 on the same lane as the motorcycle 100 is located closer to further other vehicle than the reference distance and a relative speed of the other vehicle to the further other vehicle is higher than the reference relative speed in the state where the adaptive cruise operation is performed, the safety operation performing section 53 determines that the other vehicle in the state with the collision possibility is present. When determining the presence or the absence of the other vehicle in the state with the collision possibility, the safety operation performing section 53 may determine the possibility of the collision that occurs on the lane for the vehicles heading for the same direction as the motorcycle 100 and that is caused by the other vehicle traveling on a crossing lane of the lane. For example, the safety operation performed by the safety operation performing section 53 is the operation to make the notification device 80 perform the operation to alert the rider, the operation to make the notification device 80 perform the operation to urge the rider to cancel the adaptive cruise operation, the operation to make the notification device 80 perform the operation to urge the rider to change the lane, or the like. Alternatively for example, the safety operation performed by the safety operation performing section 53 is the operation to output the command for lowering the speed generated to the motorcycle 100 in the adaptive cruise operation to the adaptive cruise operation performing section 52, the operation to output the command for lowering (preferably lowering only in the specified period) the upper limit value of the speed generated to the motorcycle 100 in the adaptive cruise operation to the adaptive cruise operation performing section 52, the operation to output the command for canceling the currently-performed adaptive cruise operation, to the adaptive cruise operation performing section 52, or the like.

The safety operation performing section 53 determines presence or absence of a traffic jam on the lane for the vehicles heading for the same direction as the motorcycle 100 on the basis of the other vehicle travel state information, for example. If determining that the traffic jam is present, the safety operation performing section 53 performs the safety operation. When determining the presence or absence of the traffic jam, the safety operation performing section 53 preferably and only selects, as the determination target, the presence or the absence of the traffic jam at a point located ahead of the motorcycle 100 on the lane for the vehicles heading for the same direction as the motorcycle 100. For example, in the case where there is the other vehicle, the speed of which is lower than the reference speed, on the entire lane for the vehicles heading for the same direction as the motorcycle 100 in the state where the adaptive cruise operation is performed, the safety operation performing section 53 determines the presence of the traffic jam. For example, the safety operation performed by the safety operation performing section 53 is the operation to make the notification device 80 perform the operation to alert the rider, the operation to make the notification device 80 perform the operation to urge the rider to cancel the adaptive cruise operation, the operation to make the notification device 80 perform the operation to urge the rider to travel between lanes, or the like. Alternatively, for example, the safety operation operated by the safety operation performing section 53 is the operation to output the command for lowering the speed generated to the motorcycle 100 in the adaptive cruise operation to the adaptive cruise operation performing section 52, the operation to output the command for canceling the currently-performed adaptive cruise operation to the adaptive cruise operation performing section 52, or the like.

<Operation of Rider-Assistance System>

A description will be made on operation of the rider-assistance system according to the embodiment.

FIG. 3 is a chart of an example of a control flow in the controller of the rider-assistance system according to the embodiment of the present invention.

The controller 50 repeatedly executes the control flow illustrated in FIG. 3 while the adaptive cruise operation is valid.

(Acquisition Step)

In step S101, the acquisition section 51 acquires the surrounding environment information on the basis of the information output from the surrounding environment detector 10, acquires the rider setting information on the basis of the information output from the input device 20, and acquires information on the travel state of the motorcycle 100 on the basis of the information output from the travel state detector 30. The acquisition section 51 also acquires the other vehicle travel state information on the basis of the information output from the other vehicle travel state detector 150 of the different vehicle 200.

(Adaptive Cruise Operation Performing Step)

In step S102, the adaptive cruise operation performing section 52 controls the operation of each of the devices (the braking device 60, the drive device 70, and the like) mounted to the motorcycle 100 on the basis of the surrounding environment information, the rider setting information, and the travel state information acquired in step S101, so as to make the motorcycle 100 perform the adaptive cruise operation.

(Safety Operation Performing Step)

In step S103, the safety operation performing section 53 determines whether it is necessary for the motorcycle 100 to perform the safety operation on the basis of the other vehicle travel state information acquired in step S101. If determining that it is necessary for the motorcycle 100 to perform the safety operation, in step S104, the safety operation performing section 53 makes the motorcycle 100 perform the safety operation.

<Effects of Rider-Assistance System>

A description will be made on effects of the rider-assistance system according to the embodiment.

In the rider-assistance system 1, the acquisition section 51 in the controller 50 acquires the other vehicle travel state information, which is the information on the travel state of the other vehicle acquired by the different vehicle 200 from the motorcycle 100, via the wireless communication, and the controller 50 further includes the safety operation performing section 53, which makes the motorcycle 100 currently performing the adaptive cruise operation perform the safety operation on the basis of the other vehicle travel state information acquired by the acquisition section 51. That is, it is possible for the motorcycle 100 during the adaptive cruise operation to perform the safety operation on the basis of the information beyond the detection range of the surrounding environment detector 10 mounted to the motorcycle 100. Therefore, it is possible to perform the safety operation at a further early stage and thus to reliably secure the rider's safety.

Preferably, in the rider-assistance system 1, the other vehicle travel state information includes at least one type of the information including the speed, the acceleration/deceleration, the position, and the advancing direction of the other vehicle. With such a configuration, it is possible for the motorcycle 100 during the adaptive cruise operation to perform the appropriate safety operation, and thus the rider's safety is further reliably secured.

Preferably, in the rider-assistance system 1, the safety operation performing section 53 determines the presence or the absence of the other vehicle in the sudden deceleration state on the lane for the vehicles heading for the same direction as the motorcycle 100 on the basis of the other vehicle travel state information. If determining that such other vehicle is present, the safety operation performing section 53 performs the safety operation. Therefore, it is possible to handle the sudden deceleration, which is generated beyond the detection range of the surrounding environment detector 10 mounted to the motorcycle 100, at the further early stage and thus to further reliably secure the rider's safety.

Preferably, in the rider-assistance system 1, the safety operation performing section 53 determines the presence or the absence of the other vehicle in the state with the collision possibility on the lane for the vehicles heading for the same direction as the motorcycle 100 on the basis of the other vehicle travel state information. If determining that such other vehicle is present, the safety operation performing section 53 performs the safety operation. Therefore, it is possible to handle the collision possibility of the other vehicle, which travels beyond the detection range of the surrounding environment detector 10 mounted to the motorcycle 100 and should be looked carefully, at the further early stage and thus to further reliably secure the rider's safety.

Preferably, in the rider-assistance system 1, the safety operation performing section 53 determines the presence or the absence of the traffic jam on the lane for the vehicles heading for the same direction as the motorcycle 100 on the basis of the other vehicle travel state information. If determining that the traffic jam is present, the safety operation performing section 53 performs the safety operation. Therefore, it is possible to handle the situation that occurs beyond the detection range of the surrounding environment detector 10 mounted to the motorcycle 100 and that should be looked carefully at the further early stage and thus to further reliably secure the rider's safety.

Preferably, the safety operation is the operation to alert the rider of the motorcycle 100, the operation to urge the rider of the motorcycle 100 to cancel the adaptive cruise operation, the operation to urge the rider of the motorcycle 100 to change the lane, the operation to urge the rider of the motorcycle 100 to make the travel between the lanes, or the like. With such a configuration, effectiveness of the safety operation is guaranteed, and thus the rider's safety is further reliably secured.

Preferably, the safety operation is the operation to lower the speed generated to the motorcycle 100 in the adaptive cruise operation, the operation to lower the upper limit value of the speed to be generated by the motorcycle 100 in the adaptive cruise operation, the operation to cancel the currently-performed adaptive cruise operation, or the like. With such a configuration, the effectiveness of the safety operation is guaranteed, and thus the rider's safety is further reliably secured.

The present invention is not limited to the embodiment that has been described. For example, only a part of the embodiment may be implemented, or parts of the embodiment may be combined.

REFERENCE SIGNS LIST

1: Rider-assistance system
10: Surrounding environment detector
20: Input device
30: Travel state detector
50: Controller
51: Acquisition section
52: Adaptive cruise operation performing section
53: Safety operation performing section
60: Braking device
70: Drive device
80: Notification device
100: Motorcycle
150: Other vehicle travel state detector
200: Different vehicle

The invention claimed is:

1. A controller (50) that controls operation of a motorcycle (100), to which a surrounding environment detector (10) is mounted, the controller (50) comprising:

an acquisition section (51) that acquires information on a surrounding environment of the motorcycle (100) based on output of the surrounding environment detector (10) during travel of the motorcycle (100), and acquires other vehicle travel state information that is information on a travel state of a first vehicle acquired by a second vehicle (200) different from the motorcycle (100) or is information on a travel state of the second vehicle (200) acquired by the second vehicle (200), the other vehicle travel state information being transmitted from the second vehicle (200) via wireless communication;

an adaptive cruise operation performing section (52) that makes the motorcycle (100) perform an adaptive cruise operation based on the surrounding environment information acquired by the acquisition section (51); and a safety operation performing section (53) that makes the motorcycle (100) performing the adaptive cruise operation perform a safety operation based on the other vehicle travel state information acquired by the acquisition section (51), wherein the safety operation includes an operation to urge the rider of the motorcycle (100) to make travel between lanes.

2. The controller (50) according to claim 1, wherein the other vehicle travel state information includes at least one type of information selected from the group consisting of a speed, acceleration/deceleration, a position, and an advancing direction of the first vehicle or the second vehicle (200).

3. The controller (50) according to claim 1, wherein the safety operation performing section (53) determines presence or absence of the first vehicle or the second vehicle (200) in a sudden deceleration state on a lane for vehicles heading for the same direction as the motorcycle (100) based on the other vehicle travel state information, and, if determining that the first vehicle or the second vehicle (200) is present, performs the safety operation.

4. The controller (50) according to claim 1, wherein the safety operation performing section (53) determines presence or absence of the first vehicle or the second vehicle (200) in a state with a collision possibility on the lane for the vehicles heading for the same direction as the motorcycle (100) based on the other vehicle travel state information, and, if determining that the first vehicle or the second vehicle (200) is present, performs the safety operation.

5. The controller (50) according to claim 1, wherein the safety operation performing section (53) determines presence or absence of a traffic jam on the lane for the vehicles heading for the same direction as the motorcycle (100) based on the other vehicle travel state information, and, if determining that the traffic jam is present, performs the safety operation.

6. The controller (50) according to claim 1, wherein the safety operation is operation to alert a rider of the motorcycle (100).

7. The controller (50) according to claim 1, wherein the safety operation is operation to urge the rider of the motorcycle (100) to cancel the adaptive cruise operation.

8. The controller (50) according to claim 1, wherein the safety operation is operation to urge the rider of the motorcycle (100) to change a lane.

9. The controller (50) according to claim 1, wherein
the safety operation is operation to lower a speed generated to the motorcycle (100) in the adaptive cruise operation.

10. The controller (50) according to claim 1, wherein
the safety operation is operation to lower an upper limit value of the speed to be generated by the motorcycle (100) in the adaptive cruise operation.

11. The controller (50) according to claim 1, wherein
the safety operation is operation to cancel the currently-performed adaptive cruise operation.

12. The controller (50) according to claim 1, wherein the first vehicle or the second vehicle (200) is located at a position beyond a detection range of the surrounding environment detector (10).

13. The controller (50) according to claim 1, wherein at least one of the first vehicle and the second vehicle is a four-wheeled vehicle.

14. A control method that controls operation of a motorcycle (100), to which a surrounding environment detector (10) is mounted, the control method comprising:
an acquisition step (S101) in which an acquisition section (51) of a controller (50) acquires information on a surrounding environment of the motorcycle (100) based on output of the surrounding environment detector (10) during travel of the motorcycle (100) and acquires other vehicle travel state information that is information on a travel state of a first vehicle acquired by a second vehicle (200) different from the motorcycle (100) or is information on a travel state of the second vehicle (200) acquired by the second vehicle (200), the other vehicle travel state information being transmitted from the second vehicle (200) via wireless communication; and
an adaptive cruise operation performing step (S102) in which an adaptive cruise operation performing section (52) of the controller (50) makes the motorcycle (100) perform an adaptive cruise operation based on the surrounding environment information acquired in the acquisition step (S101),
the control method further comprising safety operation performing steps (S103, S104) in which a safety operation performing section (53) of the controller (50) makes the motorcycle (100) currently performing the adaptive cruise operation perform safety operation based on the other vehicle travel state information acquired in the acquisition step (S101),
wherein the safety operation includes an operation to urge the rider of the motorcycle (100) to make travel between lanes.

* * * * *